US006839344B1

(12) United States Patent
Couillaud et al.

(10) Patent No.: US 6,839,344 B1
(45) Date of Patent: Jan. 4, 2005

(54) TRANSPORT MECHANISM FOR ISDN BACKHAUL OVER IP

(75) Inventors: Pierre Couillaud, Belleville (CA); Milos D. Pujic, Belleville (CA); Craig S. Telke, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 959 days.

(21) Appl. No.: 09/738,983

(22) Filed: Dec. 19, 2000

(51) Int. Cl.[7] .............................................. H04L 12/66
(52) U.S. Cl. ........................ 370/353; 370/384; 370/524
(58) Field of Search ................................. 370/354, 467, 370/522, 523, 384, 385, 395.52, 410

(56) References Cited

U.S. PATENT DOCUMENTS 6,178,173 B1 * 1/2001 Mundwiler et al. ......... 370/410
6,728,748 B1 * 4/2004 Mangipudi et al. ......... 718/105

OTHER PUBLICATIONS

R. Stewart et al.; "Stream Control Transmission Protocol"; IETF RFC 2960, Oct. 2000; pp. 1–134.
K. Morneault et al.; "ISDN Q.921–User Adaptation Layer"; version 8; IETF Work in Progress; Nov. 2000; pp. 1–51.
Information Science Institute; "Transmission Control Protocol"; DARPA Internet Program Protocol Specification; IETF RFC 793; Sep. 1981; pp. 1–85.
M.T. Rose and D.E. Cass; "ISO Transport Service on Top of the TCP"; IETF RFC 1006; May 1987; pp. 1–18.
J. Postel; "User Datagram Protocol"; IETF RFC 768; AUg. 1980; pp. 1–3.

* cited by examiner

Primary Examiner—Wellington Chin
Assistant Examiner—Mark A Mais

(57) ABSTRACT

A method and apparatus are provided for establishing and maintaining a backhaul link over an Internet Protocol based network for transporting Layer 3 ISDN messages. A signalling gateway establishes a TCP connection to a Media Gateway Controller through the IP based network. The Layer 3 ISDN messages generated within an ISDN network attached to the IP based network are then transported between the signalling gateway and the Media Gateway Controller over the TCP connection. The integrity of the TCP connection is monitored using a heartbeat mechanism based on UDP packets. Both the signalling gateway and the Media Gateway Controller transmit UDP packets at regular intervals, and monitor for the arrival of UDP packets from the other device. If a provisioned number of consecutive UDP packets do not arrive from the other device, then a failure of the backhaul link is declared. The signalling gateway then attempts to re-establish the backhaul link.

33 Claims, 11 Drawing Sheets

TRANSPORT MECHANISM FOR ISDN BACKHAUL OVER IP

FIELD OF THE INVENTION

This invention relates to Internet Protocol based communication systems, and more particularly to transport of Layer 3 Integrated Digital Subscriber Network messages over such systems.

BACKGROUND OF THE INVENTION

Integrated Services Digital Network (ISDN) systems provide a possible means of accomplishing voice over Internet Protocol (IP), partly because ISDN calls use a protocol stack which can interface with packet switched networks. ISDN systems use two types of channels, B-channels and D-channels. B-channels carry traffic encapsulated at Layer Two of the Open Systems Interconnect (OSI) protocol stack, and can be carried over packet switched networks or circuit switched networks. D-channels carry signalling information used for instructing a carrier to set up or terminate a B-channel call, amongst other administrative functions, and are carried over packet switched networks. A D-channel carries information at both Layer Three and Layer Two of the OSI protocol stack. Layer Three is responsible for call control, and a protocol called Q.931 is commonly used to convey call control messages. Q.931 messages are encapsulated using a Layer Two protocol called Q.921, and the Q.921 messages are transmitted between network elements.

To interface an ISDN network and an IP network, an ISDN endpoint, such as a Private Branch Exchange (PBX), is linked to a Signalling Gateway (SG) and a Media Gateway (MG) (which may be part of the same apparatus) through an ISDN interface. The SG and MG are in turn linked to the IP based network. The ISDN interface provides a D-channel for carrying signalling information and at least one B-channel for carrying data. For example, if the ISDN endpoint is a PBX offering a Primary Rate Interface to a number of users within a private branch office, then the ISDN interface between the PBX and the SG/MG is a T1 link with 23 B-channels and 1 D-channel (in North America or Japan) or an E1 link with 30 B-channels and 1 D-channel (in Europe). The MG is responsible for providing the B-channels with access to the IP based network, and the SG is responsible for providing the D-channel with access to the IP based network. A Media Gateway Controller (MGC) (sometimes also referred to as a Signalling Gateway Controller) is also linked to the IP based network. The MGC runs at least one Application Server Process (ASP). When a caller on the ISDN network wishes to establish a connection through the IP based network to a called device, the caller enters a dialled number. The SG asks an ASP on the MGC to establish a connection to the called device. The ASP determines an IP address and a port number of the called device based on the dialled number, and signals these to the MG, which begins transmitting the call into the IP based network. The exchange of messages between the SG and the ASP and between the ASP and the MG is referred to as call control messaging. The ASP also signals an MG to which the called device is connected to alert it that a connection is being established from the originating MG.

Unfortunately for the call control messaging, the Q.921 messages transmitted within ISDN networks are not recognized by IP based networks. In order to interface an ISDN network with an IP based network, an SG which receives a Q.921 message from the ISDN network must extract the enclosed Q.931 message and encapsulate it into a message format recognizable by a transport layer protocol of the IP based network for transmission through the IP based network. The transport of a Q.931 message within an IP transport layer message is called backhauling. The Integrated Services Digital Network (ISDN) User Adaptation Layer (IUA) (described in "ISDN Q.921-User Adaptation Layer", version 8, IETF Work in Progress, November 2000, and incorporated by reference herein) proposes a mechanism for ISDN backhaul over IP. An SG which receives a Q.921 message terminates the Q.921 message, in that it is at this level of encapsulation that the SG processes and retransmits the ISDN message. The IUA proposes using the Stream Control Transmission Protocol (SCTP), described in "Stream Control Transmission Protocol", IETF RFC 2960, October 2000, as the IP transport layer protocol in which Q.931 messages are encapsulated. However, SCTP is not yet clearly defined, and as a new protocol will most likely not be as reliable as more established transport layer protocols such as the Transmission Control Protocol (TCP) and the User Datagram Protocol (UDP). Unfortunately, even these established protocols have their shortcomings. TCP provides very reliable delivery of messages, but is not efficient at detecting loss of connectivity. This can lead to the MGC and the PBX becoming unsynchronized with respect to which transmission resources are available. UDP is efficient at detecting loss of connectivity, but does not provide reliable delivery of messages.

SUMMARY OF THE INVENTION

The present invention provides a method of backhauling a Layer Three ISDN message from a gateway to an Application Server Process (ASP) over an Internet Protocol (IP) based network, the gateway receiving the Layer Three ISDN message from an ISDN based network. The gateway establishes a backhaul link to the ASP in conformance with the Transmission Control Protocol. Both the gateway and the ASP monitor for failure of the backhaul link by using heartbeat messages in conformance with the User Datagram Protocol (UDP). Each of the gateway and the ASP transmit at regular intervals a series of heartbeat messages to the other device, the heartbeat messages being in conformance with the UDP. Each device monitors the arrival of heartbeat messages from the other device. When either device detects the absence of a provisioned number of consecutive heartbeat messages, a backhaul link failure is declared. If the gateway detects the backhaul link failure, the gateway re-establishes the backhaul link. If the ASP detects the backhaul link failure, the ASP stops its transmission of heartbeat messages and sends a TCP Reset segment to the gateway.

The method provides a reliable method of delivering ISDN call control messages over IP based networks. By using a combination of TCP and UDP, reliable message delivery is assured and connectivity is monitored continuously. The method is also stable, in that both TCP and UDP are well established protocols.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
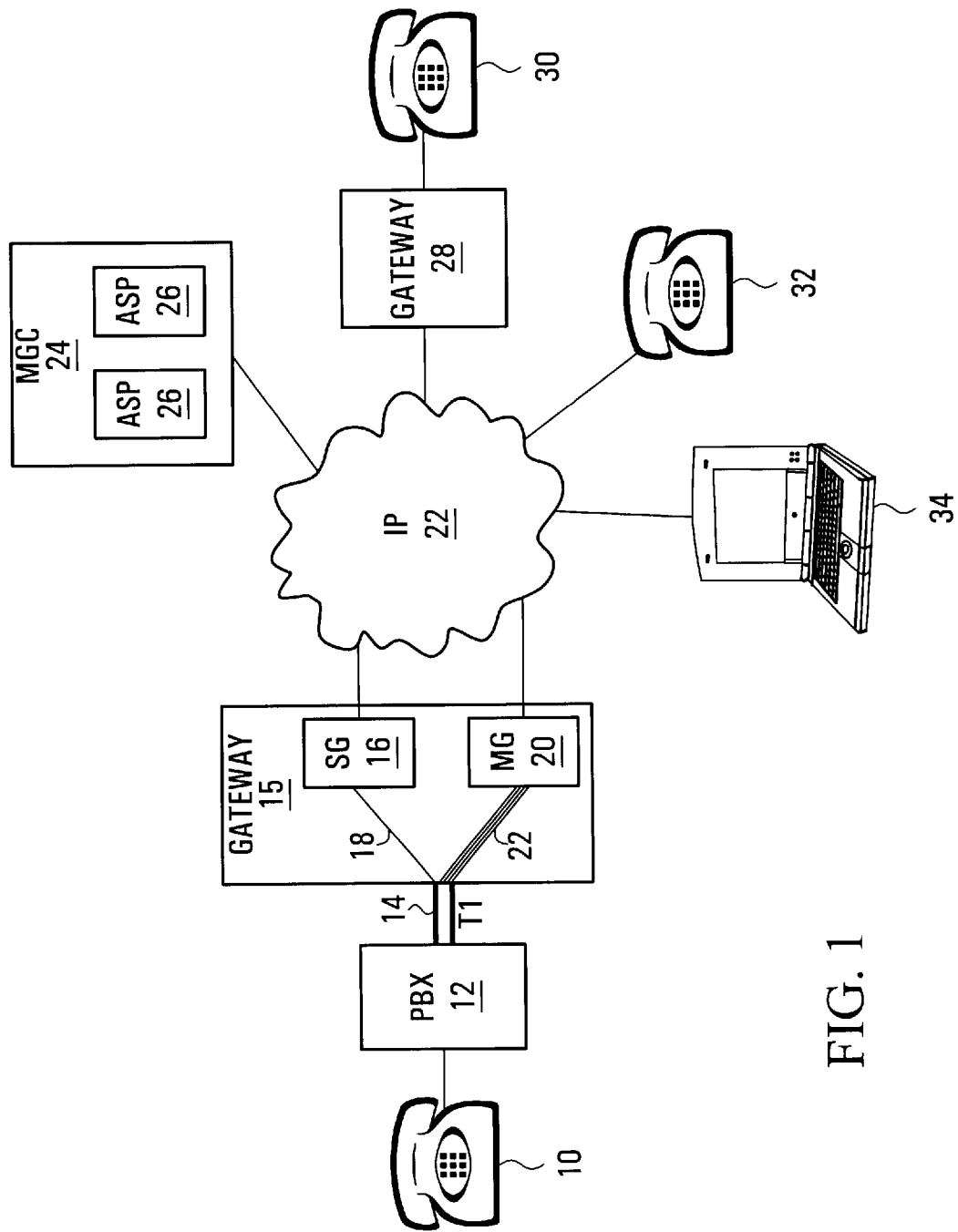
FIG. 1 is a block diagram of a portion of a communication system in which the invention is implemented.

Referring to FIG. 1, a portion of a communication system employing Integrated Services Digital Network (ISDN) and Internet Protocol (IP) is shown. A calling terminal 10 within a private office is connected to a Private Branch Exchange (PBX) 12. The PBX 12 is connected to a gateway 15 which includes a Signal Gateway (SG) 16 and a Media Gateway (MG) 20. Alternatively, the SG 16 and the MG 20 can be located on separate hardware devices, although they will still be considered as an associated pair. The PBX 12 is linked to the gateway 15 by an ISDN interface. In FIG. 1 the ISDN interface is a T1 line 14, although it could alternatively be an E1 line. One channel of the T1 line 14 is a D-channel 18 (or signalling channel) which provides access to the SG 16. The remaining channels within the T1 line 14 are B-channels 22 (or media channels) which provide access to the MG 20. More than one ISDN interface, from the same or from a different PBX, may be linked to the gateway 15. In such a case the SG 16 may manage more than one D-channel, although under some signalling schemes one D-channel is active for more than one ISDN interface.

The PBX 12 and the gateway 15 provide the calling terminal 10 (and other terminals which are not shown) with an ISDN connection to an IP based network 22. The SG 16 and the MG 20 are linked to the IP based network 22. One or more Media Gateway Controllers (MGCs) 24 are also linked to the IP based network 22, although only one MGC is shown in FIG. 1. Each MGC 24 includes one or more Application Server Processes (ASPs) 26 running as software, each of which is an instance of a call processing service. A particular call may have up to three associated ASPs: a primary ASP, a secondary ASP, and a tertiary ASP. The primary, secondary, and tertiary ASPs may be located on separate MGCs in order to provide redundancy, in which case the three ASPs are considered to make up a single logical Application Server.

In addition to the calling terminal 10 connected through the PBX 12 and the gateway 15 to the IP based network 22, there may also be one or more telephones 30 connected to the IP based network 22 through a gateway 28, the gateway 28 being similar to the gateway 15 if the gateway 28 is terminating one or more ISDN interfaces, one or more Universal Serial Bus (USB) equipped telephones 32 connected directly to the IP based network 22, and one or more computers 34 connected directly to the IP based network 22, each computer 34 being equipped with a microphone and a speaker so as to allow voice communications. For any call connection, any of the telephones 30, USB equipped telephones 32, or computers 34 may be a called terminal. It will be assumed in this description that the telephone 30 is the called terminal.

Figure 2:
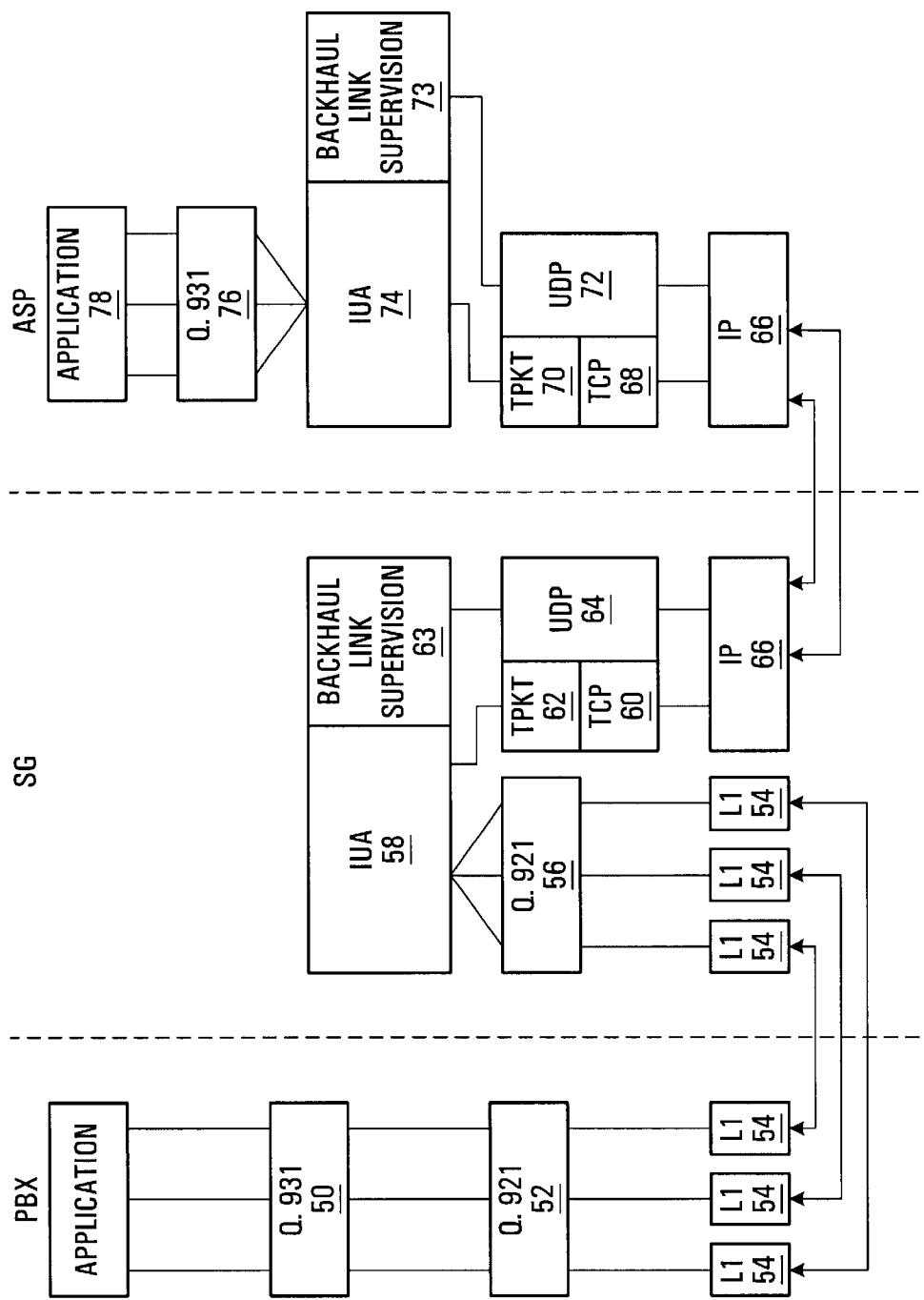
FIG. 2 is a diagram of protocol stacks used in communication between a Private Branch Exchange PBX, a Signal Gateway (SG), and an Application Server Process (ASP)

When a user of the calling terminal 10 initiates a call by entering a dialled number of the called terminal 30, the PBX 12, the gateway 15, and an ASP 26 communicate with each other by passing messages to each other to establish a call connection. This is referred to as call control messaging. The SG 16 and the ASP 26 communicate over a backhaul link. Referring to FIG. 2, a diagram of message protocols used during call control messaging is shown. The PBX 12 generates a Q.931 message 50. The PBX 12 encapsulates the Q.931 message 50 within a Q.921 message 52, and then transmits the Q.921 message 52 as a Layer One frame 54 (such as a High Level Data Link Control frame) to the SG 16 over the D-channel 18. More than one Layer One frame 54 is shown in FIG. 2, as the SG 16 may receive one Layer One frame 54 for each of a plurality of D-channels. When the SG 16 receives the Layer One frame 54, the SG 16 extracts a Q.921 message 56 which, barring transmission errors, is the same as the Q.921 message 52. In order to communicate with the ASP 26 over the IP based network 22, the SG 15 converts the Q.921 message 56 into a format recognized by IP based networks. The SG 16 generates an ISDN User Adaptation (IUA) message 58 in accordance with "ISDN Q.921-User Adaptation Layer", version 8, IETF Work in Progress, November 2000 (referred to herein as the IUA draft).

The SG 16 segments and encapsulates the IUA message 58 into one or more Transmission Control Protocol (TCP) segments 60. The Transmission Control Protocol is defined in "Transmission Control Protocol", DARPA Internet Program Protocol Specification, IETF RFC 793, September 1981, incorporated by reference herein. There may be more than one TCP segment 60 per IUA message 58, and hence more than one TCP segment 60 per Q.931 message 50. The TCP segments 60 are sent in conformance with a TCP Packet (TPKT) protocol (described in "ISO Transport Service on top of the TCP", IETF RFC 1006, May 1987, incorporated by reference herein) so that an ASP 26 can reassemble the TCP segments 60. The SG 16 then encapsulates the TCP segments 60 into IP datagrams 66, and transmits the IP datagrams 66 to an ASP 26 through the IP based network 22. The ASP 26 to which the IP datagrams 66 are sent may be a primary ASP, a secondary ASP, or a tertiary ASP depending on the availability of each ASP. When the ASP 26 receives each IP datagram 66, the ASP 26 consults a standard protocol field in the IP datagram and determines that the received IP datagram 66 is to be passed up the stack to a TCP program for processing. The ASP 26 extracts a TCP segment 68 from the IP datagram 66. Each received TCP segment 68 should be the same as the corresponding TCP segment 60 transmitted by the SG 16, barring transmission errors. Once all the TCP segments 68 for a TPKT message 70 have arrived, the ASP 26 assembles the TCP segments 68 and extracts an IUA message 74. The IUA message 74 should be the same as the IUA message 58. The ASP 26 extracts a Q.931 message 76 from the IUA message 74. The Q.931 message 76 should be the same as the Q.931 message 50. The Q.931 message 76 is then passed to a call processing application 78. The call processing application 78 processes the call connection by determining an IP address and a port number of the dialled number. Once this information is determined, the ASP 26 sends Q.931 messages back to the PBX 12 through the MG 20 using the same protocol stack as is shown in FIG. 2, but in reverse order.

In parallel with the TCP segments 60, a backhaul link supervision process 63 within the SG 16 sends a series of User Datagram Protocol (UDP) packets 64 to the ASP 26. The User Datagram Protocol is defined in "User Datagram Protocol", IETF RFC 768, August 1980, incorporated by reference herein. As with the TCP segments 60, UDP packets 64 are encapsulated within IP datagrams 66. The UDP packets 64 are transmitted at regular intervals so as to function as a heartbeat mechanism. A backhaul link supervision process 73 within the ASP 26 also sends UDP packets 72 at regular intervals to the SG 16 so as to function as a heartbeat mechanism. The TCP segments 60 are transported over a standard TCP connection, established between the SG 16 and the ASP 26 using conventional TCP signalling as described below with reference to FIG. 4. The TCP connection is a backhaul link over which the Q.931 messages are backhauled reliably. The UDP packets 64 are transported using standard IP routing, and are used to monitor for failures of the backhaul link.

In accordance with IETF RFC 768, a UDP packet includes a source port field, a destination port field, and a payload. A port identifies an application process within a device. The SG 16 populates the fields of a UDP packet 64 by placing a well known port number of the ASP 26 in the destination port field, by placing a well known port number of the SG 16 in the source port field, and by placing ASCII text in the payload so as to identify the UDP packet 64 as a UDP heartbeat packet. The ASCII text uniquely identifies the SG 16 as the originator of the heartbeat message, and may be defined based on the Message Gateway Controller Protocol (MGCP)-like naming convention that represents a complete domain name of the SG 16. Inclusion of the complete domain name of the SG 16 in the UDP heartbeat packets also allows the ASP 26 to keep track of from which devices TCP connection requests should be accepted.

The ASP 26 populates the fields of a UDP packet 72 by placing the well known port number of the ASP 26 in the source port field, by placing the well known port number of the SG 16 in the destination port field, and by placing ASCII text in the payload so as to identify the UDP packet 72 as a UDP heartbeat packet. The ASCII text uniquely identifies the ASP 26 as the originator of the UDP heartbeat packet, and may be defined based on the MGCP-like naming convention that represents a complete domain name of the ASP 24.

Figure 3:
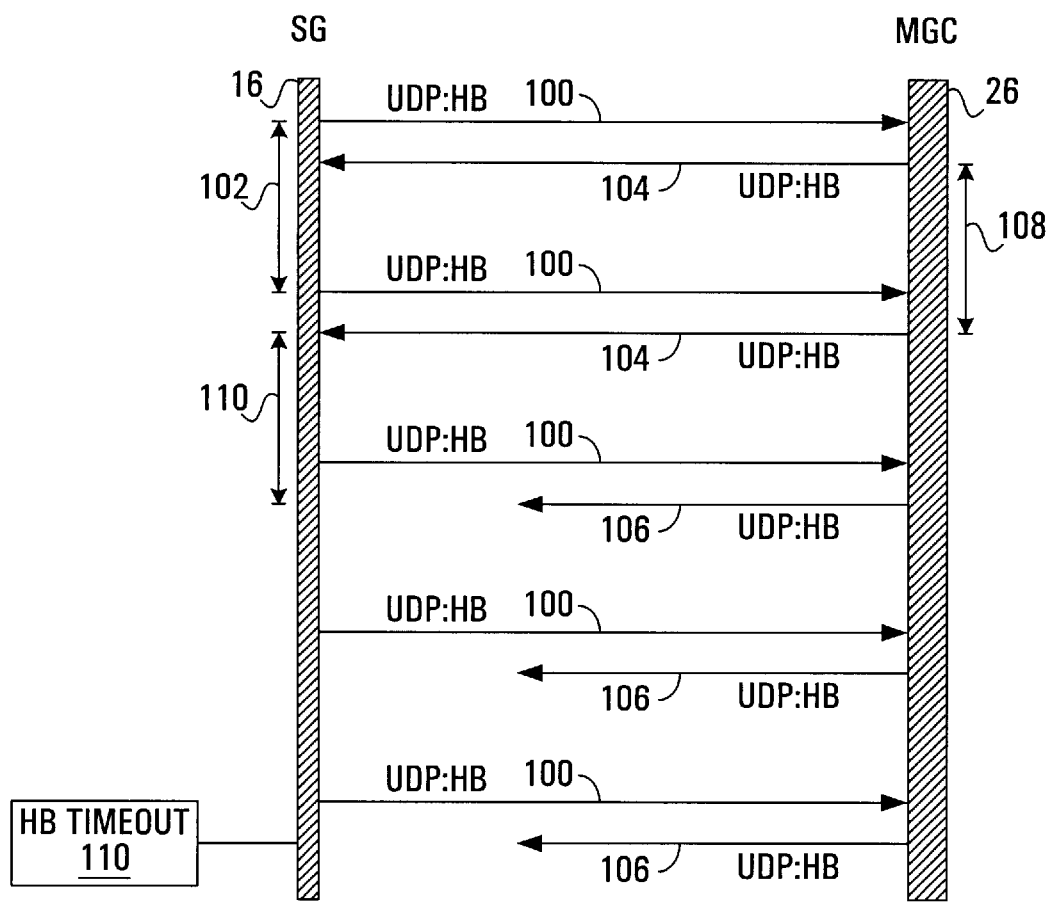
FIG. 3 is a diagram of a signalling scheme for detecting backhaul link failure.

Broadly, each of the SG 16 and the ASP 26 has two responsibilities regarding the UDP heartbeat packets. Each device transmits UDP heartbeat packets to the other device and monitors the arrival of UDP heartbeat packets from the other device while the first device believes the backhaul link is intact. Referring to FIG. 3, a SG 16 transmits a series of UDP heartbeat (UDP:HB) packets 100 to an ASP 26 under certain circumstances described below. The UDP:HB packets 100 are sent at a regular interval 102, which is provisionable. An interval of two seconds may be reasonable. The ASP 26 also transmits a series of UDP:HB packets 104 and 106 to the SG 16 under certain circumstances described below, which will generally not be the same circumstances under which the SG 16 sends UDP:HB packets 100. The UDP:HB packets 104 and 106 are also sent at a regular interval 108. Upon receipt of a UDP:HB packet 104 by the SG 16, the SG 16 starts a timer. When the next UDP:HB packet 104 arrives, the timer is restarted. If a UDP:HB packet 106 is blocked due to failure of the backhaul link and does not arrive at the SG 16 within an expected interval 110 (which is the same interval as the interval 108), the SG 16 realizes that a UDP:HB packet is missing. The timer at the SG 16 is restarted and the SG 16 awaits the arrival of the next UDP:HB packet. If a provisioned number of consecutive UDP:HB packets are missed (in FIG. 3, the provisioned number being three), a heartbeat time-out is declared at 110, and the SG 16 declares a backhaul link failure. Similarly, the ASP 26 declares a backhaul link failure if the provisioned number of consecutive UDP:HB packets do not arrive from the SG 16.

In the maintenance procedures described below, it is assumed that it is the responsibility of the SG 16 to establish and maintain the backhaul link, that it is the responsibility of the ASP 26 to establish and maintain a data link, that the SG 16 attempts to re-establish a backhaul link when the SG 16 detects a backhaul link failure, that the ASP 26 does not attempt to re-establish a backhaul link when the ASP 26 detects a backhaul link failure, and that the SG 16 only attempts to re-establish a broken data link under instructions from the ASP 26.

Figure 4:
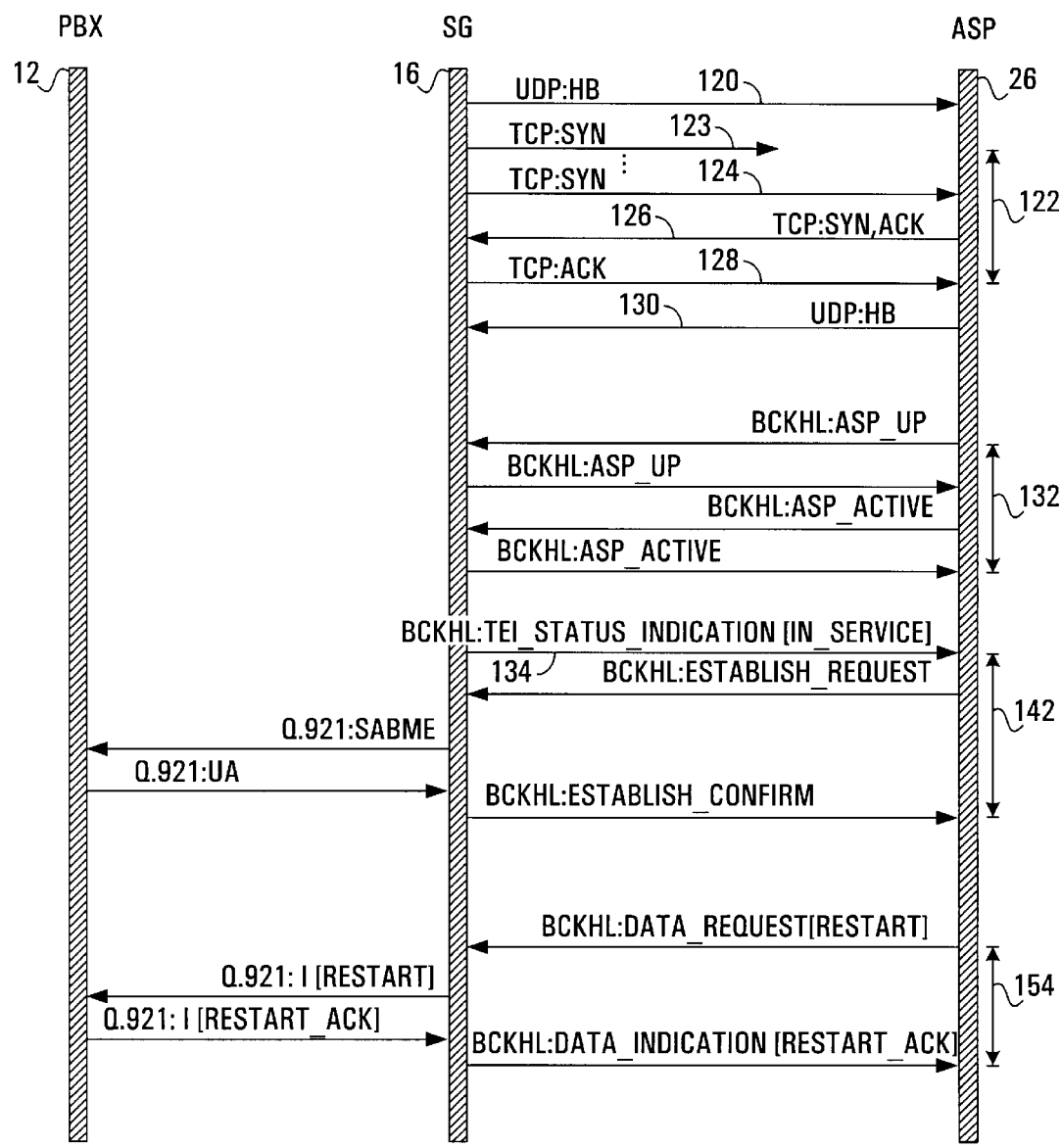
FIG. 4 is a diagram of a signalling scheme carried out upon startup of a gateway.

Referring first to FIG. 4, a diagram of a signalling scheme carried out upon startup of a gateway 15 is shown. The signalling is initiated after reboot of the gateway 15, which occurs after new provisioning is received and activated. Upon startup, the SG 16 within the gateway 15 starts transmission of UDP:HB packets 120 to the ASP 26 in conformance with the method shown in FIG. 3, although only the first UDP:HB packet 120 is shown in FIG. 4. The SG 16 then establishes a backhaul link to the ASP 26 during procedure 122. The backhaul link is a TCP connection, and is established using conventional TCP connection signals. The SG 16 transmits TCP Synchronization (TCP:SYN) segments 123 until a TCP:SYN segment 124 is received by the ASP 26, as indicated by a response from the ASP 26 in the form of a TCP Synchronization and Acknowledgement (TCP:SYN,ACK) segment 126. The SG 16 then sends a TCP Acknowledgement (TCP:ACK) segment 128 to the ASP 26. Following the establishment of the backhaul link between the SG 16 and the ASP 26, the ASP 26 starts transmission of UDP:HB packets 130 to the SG 16 in conformance with the method shown in FIG. 3, although only the first UDP:HB packet 130 is shown in FIG. 4.

ASP activation signalling 132 is then exchanged over the backhaul link by the IUA layer in conformance with the IUA draft. Data link establishment signalling 142 is then exchanged between the SG 16 and the ASP 26 over the backhaul link, and between the SG 16 and the PBX 12 over the ISDN interface 14, in conformance with the IUA draft. The data link establishment signalling 142 is exchanged for every D-channel within the SG 16, so as to establish a data link for each D-channel managed by the SG 16. Layer Three restart signalling 154 may be exchanged between the ASP 26 and the SG 16 over the backhaul link, and between the SG 16 and the PBX 12 over the ISDN interface 14, in conformance with the IUA draft. The Layer Three restart signalling 154 is optional and dependent on the type of Primary Rate Interface (PRI) being offered. If implemented, the Layer Three restart signalling 154 is exchanged for every D-channel within the SG 16. Finally, the MG 20 of the gateway 15 must register with the ASP 26. This registration occurs over a standard media control link, and is not shown in FIG. 4. The only constraint the registration of the MG 20 imposes on the signalling scheme of FIG. 4 is that the registration of the MG 20 must be complete before the Layer Three restart signalling 154 is started.

Figure 5:
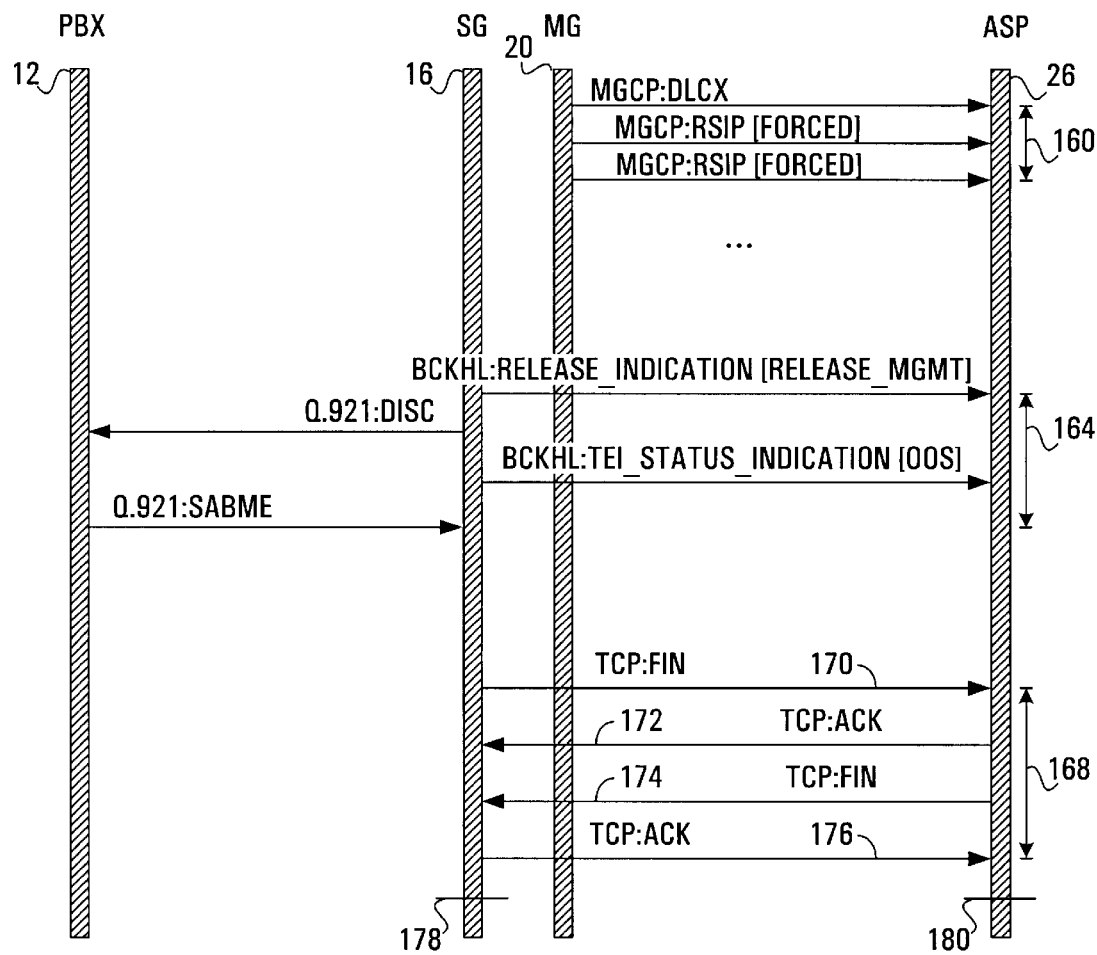
FIG. 5 is a diagram of a signalling scheme carried out upon shutdown of a gateway.

Referring to FIG. 5, a diagram of a signalling scheme carried out upon shutdown of a gateway 15 is shown. The signalling is initiated when a gateway 15 is being decommissioned. MG de-registration signalling 160 may be exchanged between the MG 20 and the ASP 26 over the standard media control link. SG deactivation signalling 164 is exchanged between the SG 16 and the ASP 26 in conformance with the IUA draft. The SG deactivation signalling 164 may include transmission of a Q.921:SABME message by the PBX, depending on provisioning of the PBX. Any Q.921:SABME message transmitted by the PBX is ignored by the SG 16, as such a message is an attempt by the PBX to re-establish the data link. The backhaul link is then released using conventional TCP disconnection signals. The SG 16 transmits a TCP Finish (TCP:FIN) segment 170 to the ASP 26. The ASP 26 responds by transmitting a TCP:ACK segment 172 to the SG 16. The ASP 26 then transmits a TCP:FIN segment 174 of its own, to which the SG 16 responds by transmitting a TCP:ACK segment 176. Once the backhaul link is released, the SG 16 stops transmission of UDP:HB packets at 178 (following transmission of the TCP:ACK segment 176) and the ASP stops transmitting UDP:HB packets at 180 (following reception of the TCP:ACK segment 176).

Figure 6:
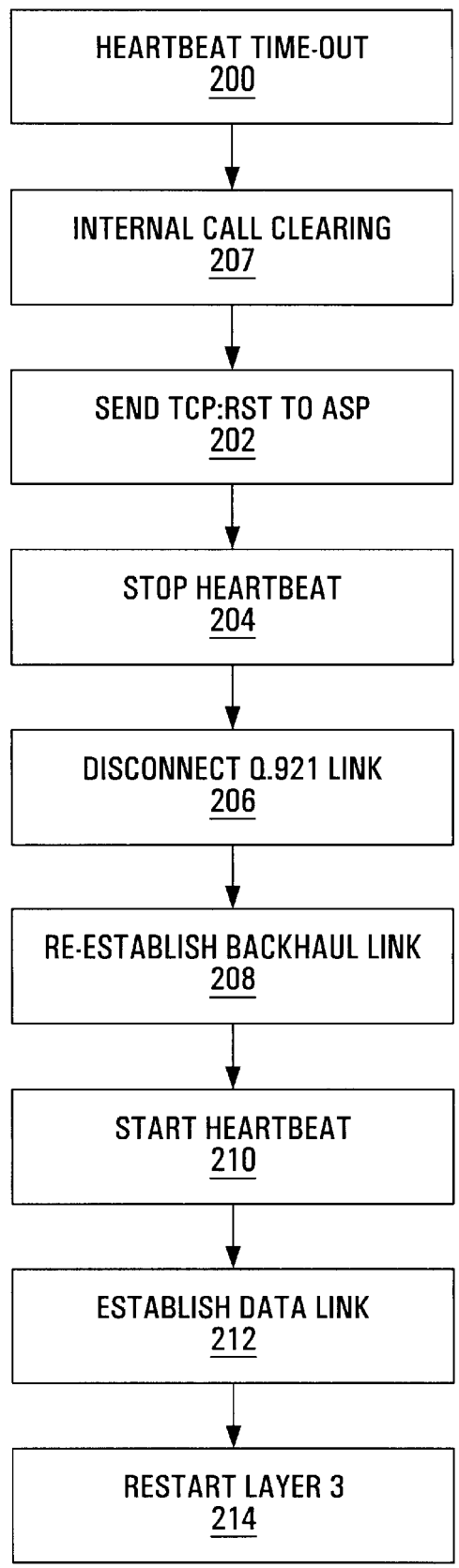
FIG. 6 is a flowchart of a method carried out by a gateway when the gateway detects a backhaul link failure.

Referring to FIG. 6, a flowchart of a method carried out by a gateway 15 upon detection of a backhaul link failure is shown. At step 200 the gateway 15 detects a heartbeat time-out, as described above with reference to FIG. 3, and realizes that a backhaul link failure has occurred.

At step 207 the gateway 15 clears internal calls by stopping all media streams, so that the gateway 15 and the ASP 26 will be synchronized as to resource usage upon re-establishment of the backhaul link. At step 202 the gateway 15 transmits a TCP Reset (TCP:RST) segment to the ASP 26. At step 204 the gateway 15 stops transmission of UDP:HB packets. Steps 202 and 204 provide redundant means of alerting the ASP 26 that there has been a backhaul link failure in case the ASP 26 has not detected the backhaul link failure on its own, and either step 202 or step 204 can be executed first. At step 206 the gateway 15 disconnects the Q.921 link with the PBX 12 by transmitting a standard Q.921 Disconnect message to the PBX 12. The PBX 12 may respond conventionally by sending a Q.921:SABME message to the gateway 15, depending on the provisioning of the PBX 12. Any Q.921:SABME message is ignored by the gateway 15, as the Q.921:SABME message is an attempt by the PBX to re-establish the data link. At step 208 the gateway 15 re-establishes a backhaul link using conventional TCP signalling, as described above as procedure 122 in FIG. 4. Q.921 link disconnection 206, internal call clearing 207, and backhaul link re-establishment 208 may be performed in any sequence. At step 210 the gateway 15 restarts transmission of UDP:HB packets. The transmission of UDP:HB packets can be restarted following reception of the TCP:SYN,ACK segment 126 (of FIG. 4), as the gateway 15 knows at this point that the backhaul link has been re-established. At step 212 the gateway 15 establishes a data link between the PBX 12 and the ASP 26 using signalling proposed in the IUA draft, as described above as procedure 142 in FIG. 4. At step 214 the gateway 15 restarts Layer Three communication between the PBX 12 and the ASP 26 using signalling proposed in the IUA draft, as described above as procedure 154 in FIG. 4.

Figure 7:
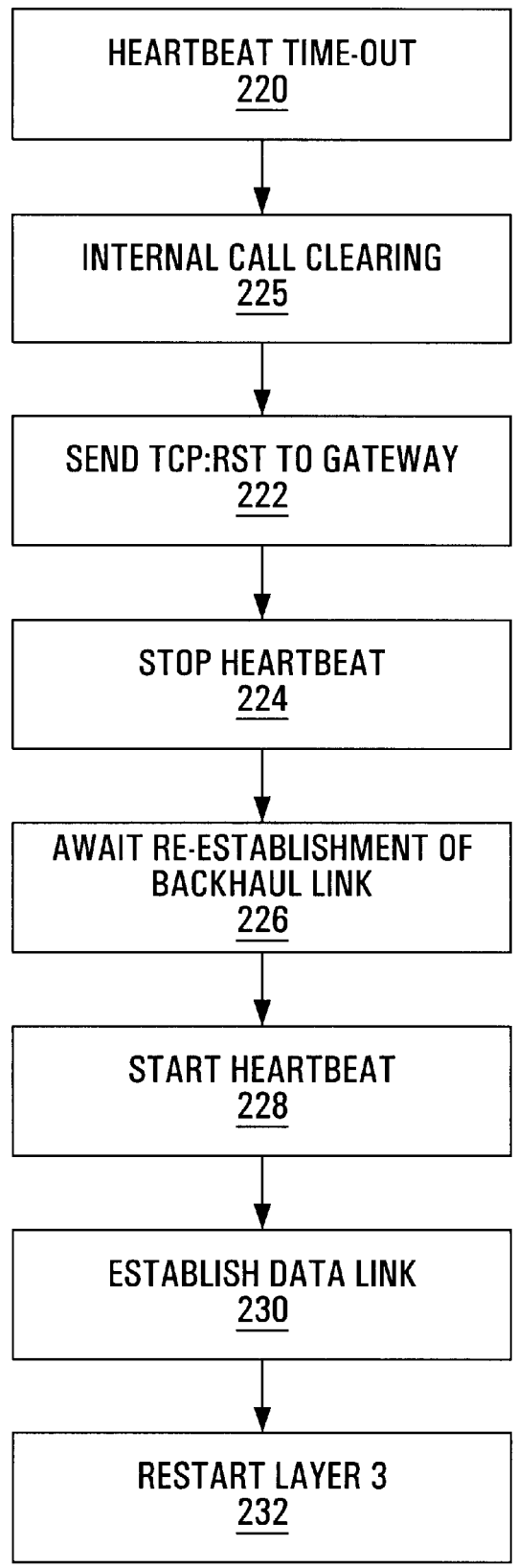
FIG. 7 is a flowchart of a method carried out by an ASP when the ASP detects a backhaul link failure.

Referring to FIG. 7, a flowchart of a method carried out by an ASP 26 upon detection of a backhaul link failure is shown. At step 220 the gateway 15 detects a heartbeat time-out, as described above with reference to FIG. 3, and realizes that a backhaul link failure has occurred. At step 225 the ASP 26 clears internal calls by stopping all media streams, so that the gateway 15 and the ASP 26 will be synchronized as to resource usage upon re-establishment of the backhaul link. At step 222 the ASP 26 transmits a TCP:RST segment to the gateway 15. At step 224 the ASP 26 stops transmission of UDP:HB packets. Steps 220 and 224 provide redundant means of alerting the gateway 15 that there has been a backhaul link failure in case the gateway 15 has not yet detected the backhaul link failure on its own, and either step 220 or step 224 can be executed first. At step 226 the ASP 26 awaits re-establishment of the backhaul link by the gateway 15 using conventional TCP signalling, as described above as procedure 122 in FIG. 4. At step 228 the ASP 26 restarts transmission of UDP:HB packets. The transmission of UDP:HB packets can be restarted following reception of the TCP:ACK segment 128 (of FIG. 4), as the ASP 26 knows at this point that the backhaul link has been re-established. At step 230 the ASP 26 establishes a data link with the PBX 12 through the gateway 15 using signalling proposed in the IUA draft, as described above as procedure 142 in FIG. 4. At step 232 the ASP 26 restarts Layer Three communication with the PBX 12 through the gateway 15 using signalling proposed in the IUA draft, as described above as procedure 154 in FIG. 4.

Figure 8:
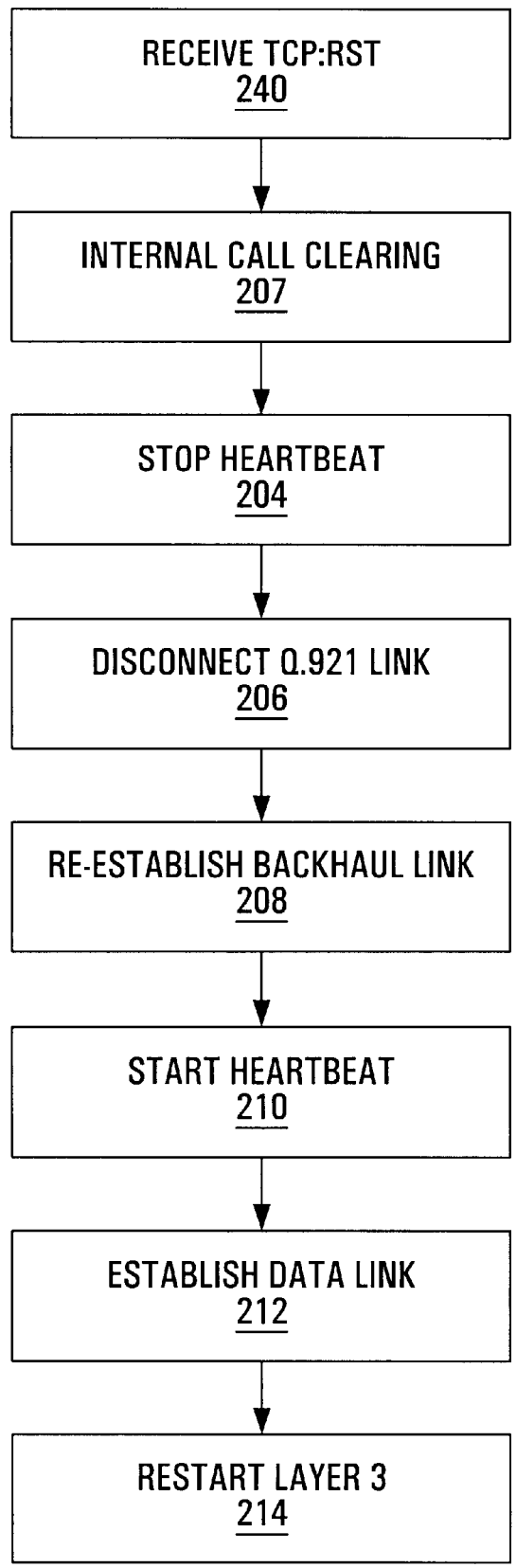
FIG. 8 is a flowchart of a method carried out by a gateway when the gateway receives a TCP Reset segment.

Referring to FIG. 8, a flowchart of a method carried out by a gateway 15 upon receipt of a TCP:RST segment from the ASP 26 is shown. The TCP:RST segment will have been sent by the ASP 26 at step 222 in FIG. 7, after the ASP 26 detects a backhaul link failure. The flowchart shown in FIG. 8 assumes that the gateway 15 has not detected the backhaul link failure on its own. If the gateway 15 has already detected the backhaul link failure as a result of a heartbeat time-out, then the method shown in FIG. 6 will have been initiated. At step 240 the gateway 15 receives a TCP:RST segment from the ASP 26. At step 207 the gateway 15 clears internal calls by stopping all media streams, so that the gateway 15 and the ASP 26 will be synchronized as to resource usage upon re-establishment of the backhaul link.

At step 204 the gateway 15 stops transmission of UDP:HB packets. Unlike the signalling shown in FIG. 6, the gateway 15 does not need to send a TCP:RST segment to the ASP 26, because the TCP:RST segment received from the ASP 26 indicates that the ASP 26 already knows of the backhaul link failure. From then on, the method is the same as is carried out when the gateway 15 detects a backhaul failure (steps 206, 208, 210, 212, and 214 of FIG. 6).

Figure 9:
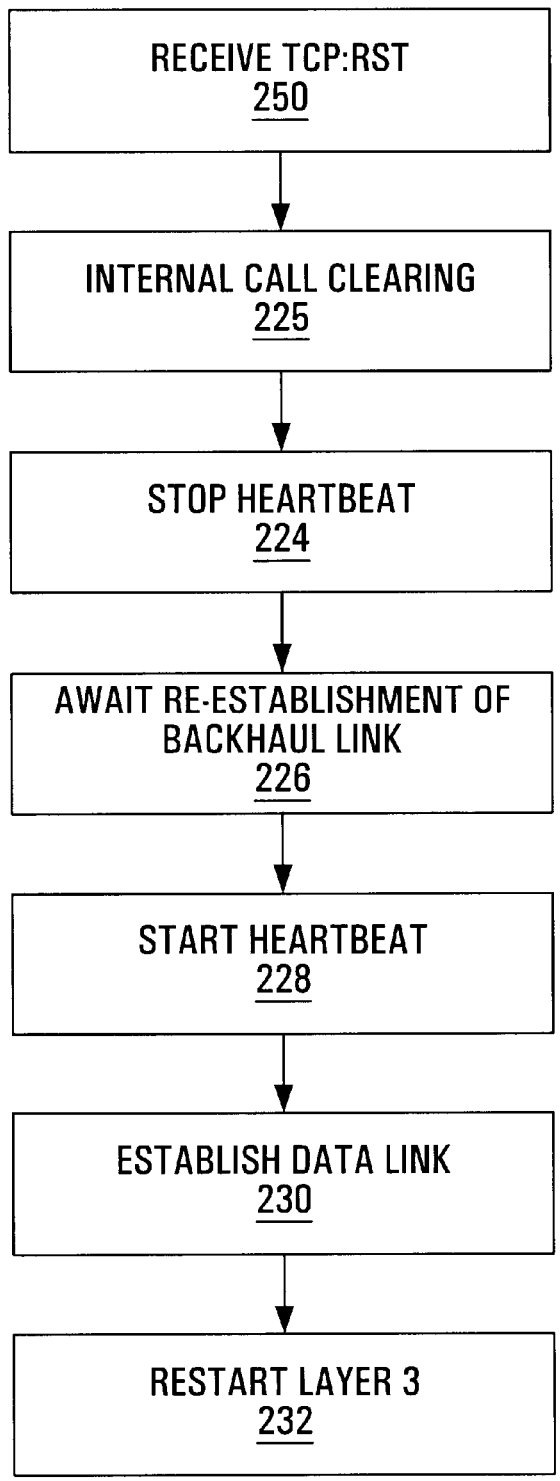
FIG. 9 is a flowchart of a method carried out by an ASP when the ASP receives a TCP Reset segment.

Referring to FIG. 9, a flowchart of a method carried out by an ASP 26 upon receipt of a TCP:RST segment from the gateway 15 is shown. The TCP:RST segment will have been sent by the gateway 15 at step 202 in FIG. 6, after the gateway 15 detects a backhaul link failure. The flowchart shown in FIG. 9 assumes that the ASP 26 has not already detected the backhaul link failure on its own. If the ASP 26 has already detected the backhaul link failure as a result of a heartbeat time-out, then the method shown in FIG. 7 will have been initiated. At step 250 the ASP 26 receives a TCP:RST segment from the gateway 15. At step 225 the ASP 26 clears internal calls by stopping all media streams, so that the gateway 15 and the ASP 26 will be synchronized as to resource usage upon re-establishment of the backhaul link. At step 224 the ASP 26 stops transmission of UDP:HB packets. Unlike the signalling shown in FIG. 7, the ASP 26 does not need to send a TCP:RST segment to the gateway 15, because the TCP:RST segment received from the gateway 15 indicates that the gateway 15 already knows of the backhaul link failure. From then on, the method is the same as is carried out when the ASP 26 detects a backhaul failure (steps 226, 228, 230, and 232 of FIG. 7).

Figure 10:
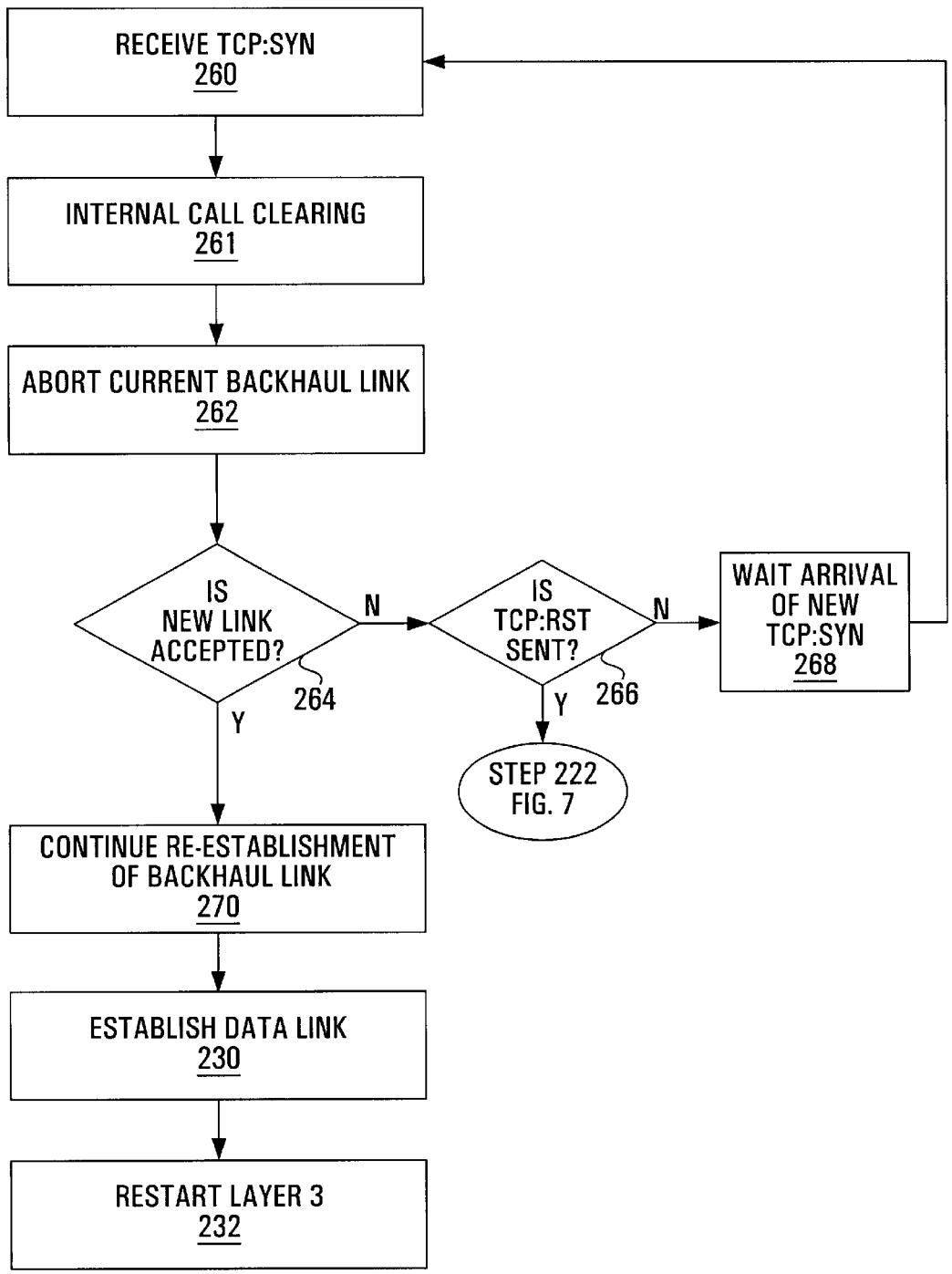
FIG. 10 is a flowchart of a method carried out by an ASP when the ASP receives a TCP Synchronization segment.

Referring to FIG. 10, a flowchart of a method carried out by an ASP 26 upon receipt of a TCP:SYN segment from the gateway 15 is shown. The TCP:SYN segment will have been sent by the gateway 15 at step 208 in FIG. 6 when the gateway 15 re-establishes a backhaul link after detection of a backhaul link failure. The flowchart shown in FIG. 10 assumes that the ASP 26 has not already detected the backhaul link failure on its own, and that the TCP:RST segment sent by the gateway 15 at step 202 of FIG. 6 has not reached the ASP 26. If the ASP 26 has already detected the backhaul link failure as a result of a heartbeat time-out, then the method shown in FIG. 7 will have been initiated. If the ASP 26 has not detected the backhaul link failure but has received the TCP:RST segment, then the method shown in FIG. 9 will have been initiated. At step 260 the ASP 26 receives a TCP:SYN segment from the gateway 15. At step 261 the ASP 26 clears internal calls by stopping all media streams, so that the gateway 15 and the ASP 26 will be synchronized as to resource usage upon re-establishment of the backhaul link. The TCP:SYN segment received at step 260 is handled internally by a TCP stack. The current backhaul link is aborted at step 262. A new backhaul link which the gateway 15 is attempting to establish using the TCP:SYN segment will either be accepted or not accepted by the TCP stack at step 264. If the TCP stack does not accept the new backhaul link at step 264, then the TCP stack may or may not send a TCP:RST segment to the gateway 15. If the TCP stack does send a TCP:RST segment to the gateway 15, then the ASP 26 acts as if it has reset the backhaul link and the method carries on starting at step 222 of FIG. 7. If the TCP stack does not send a TCP:RST segment to the gateway 15, then at step 268 the ASP 26 awaits the arrival of another TCP:SYN segment from the gateway 15. Since the gateway 15 is not receiving an acknowledgement of the TCP:SYN segment in the form of a TCP:SYN,ACK segment from the ASP 26, the gateway 15 will eventually send another TCP:SYN segment. When a new TCP:SYN segment does arrive at the ASP 26, the method of FIG. 10 returns to step 260.

If the new backhaul link which the gateway 15 is attempting to establish is accepted by the TCP stack at step 264, then the ASP 26 continues to re-establish the backhaul link through conventional TCP signalling by sending a TCP:SYN,ACK segment to the gateway 15. Once the new backhaul link is established, the ASP 26 establishes a data link at step 230 with the PBX 12 through the gateway 15 using signalling proposed in the IUA draft, as described above as procedure 142 in FIG. 4. At step 232 the ASP 26 restarts Layer Three communication with the PBX 12 through the gateway 15 using signalling proposed in the IUA draft, as described above as procedure 154 in FIG. 4.

Figure 11:
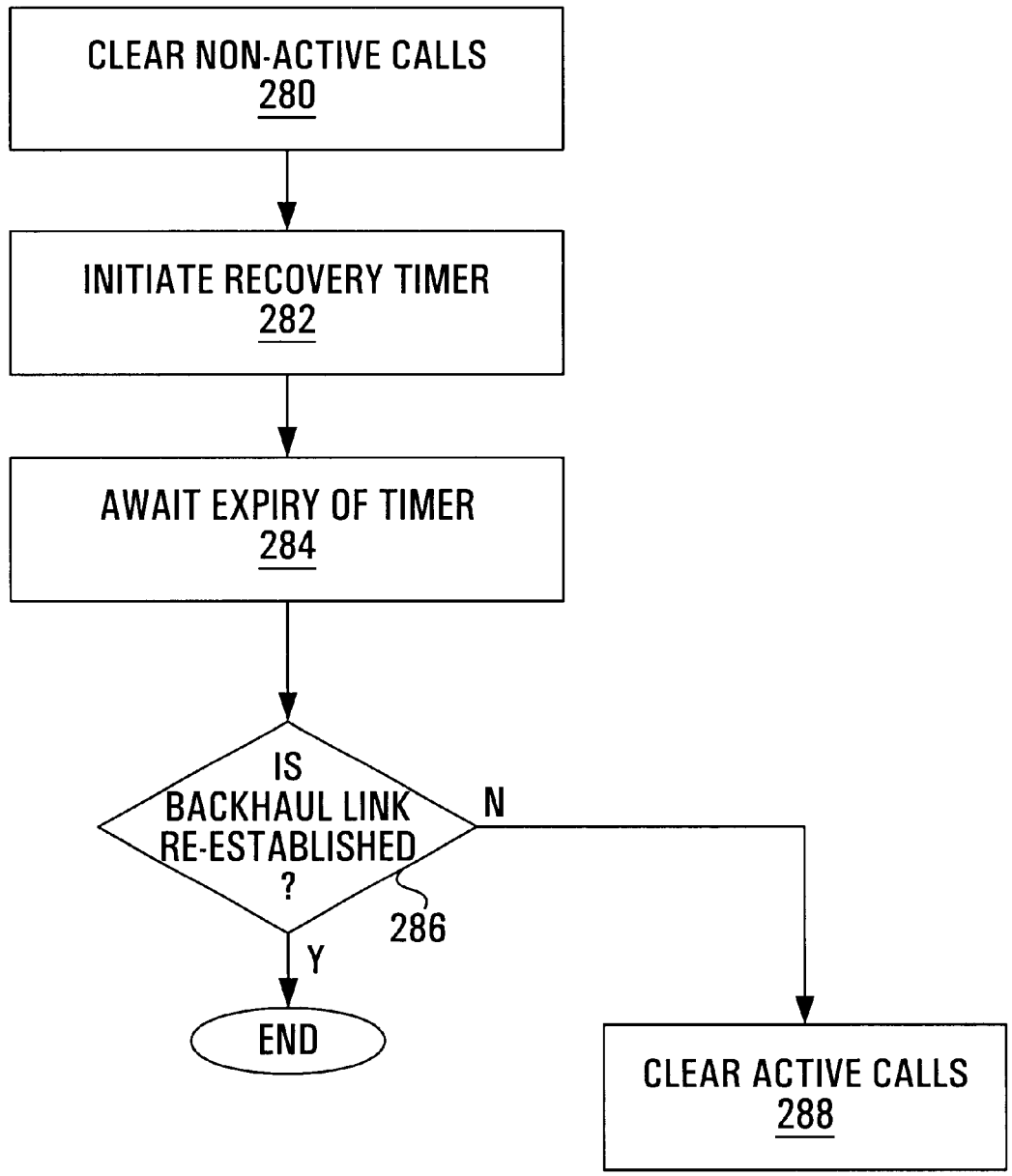
FIG. 11 is a flowchart of a method carried out by a recovery timer at a gateway and at an ASP.

A recovery timer may be implemented at the gateway 15 and at the ASP 26 in order to keep all active calls in service for a pre-defined and user configurable time-out period, in case the backhaul link can be re-established quickly. If a recovery timer is implemented, it must be implemented at both the gateway and at the ASP, and the user configurable time-out period at both the gateway and at the ASP must be identical. The recovery timer is initiated immediately upon detection of a backhaul link failure. Referring to FIG. 11, a method by which the step of internal call clearing (step 207 in FIGS. 6 and 8, step 225 in FIGS. 7 and 9, and step 261 in FIG. 10) is carried out with the use of a recovery timer is shown. At step 280, all non-active calls (that is, calls for which a complete end-to-end connection has not yet been established) are cleared by stopping the media streams of such calls. At step 282 a recovery timer is initiated. This is a process running in parallel to the signalling methods shown in the flowcharts of FIG. 6 to 10. A T.309 timer in conformance with Q.931 (defined for ISDN) may be used, as most PBX's use such a timer as well. At step 284 the recovery timer awaits expiry of the time-out period. When the time-out period expires at step 286, the gateway 15 (or ASP 26) determines whether the backhaul link has been re-established. The backhaul link may have been re-established at step 208 of FIG. 6, step 226 of FIG. 7, step 208 of FIG. 8, step 226 of FIG. 9, or step 270 of FIG. 10, depending on the circumstances under which the recovery timer was initiated. If at step 286 the gateway 15 (or ASP 26) determines that the backhaul link has been re-established, then the recovery timer ends execution. If at step 286 the gateway 15 (or ASP 26) determines that the backhaul link has not been re-established, then the gateway 15 (or ASP 26) clears all active calls by stopping the media streams of such calls.

The methods described above are not intended to be an exhaustive list, but rather are intended to explain the transmission of TCP segments and UDP packets during common maintenance procedures and events. Similar TCP signalling and UDP heartbeat signalling can be exchanged during other maintenance procedures and events.

The invention has been described with respect to backhaul of Q.931 messages over IP. The invention is applicable to the backhaul of any Layer Three ISDN call processing message, as long as Layer Two of the ISDN protocol stack is Q.921 based. For example, the invention can be used to backhaul QSIG messages through an IP based network.

What has been described is merely illustrative of the application of the principles of the invention. Other arrangements and methods can be implemented by those skilled in the art without departing from the spirit and scope of the present invention.

We claim:

1. A method of backhauling a Layer Three Integrated Services Digital Network (ISDN) message from a gateway to an Application Server Process (ASP) over an Internet Protocol (IP) based network, the gateway receiving the Layer Three ISDN message from an ISDN based network, the method comprising the steps of:

establishing a backhaul link between the gateway and the ASP in conformance with a Transmission Control Protocol; and monitoring for a failure of the backhaul link by using heartbeat messages in conformance with a User Datagram Protocol (UDP).

2. The method of claim 1 wherein the step of monitoring for a failure of the backhaul link comprises the steps of:

starting transmission at a regular interval of a first series of heartbeat messages in conformance with the UDP from the gateway to the ASP;

starting transmission at a regular interval of a second series of heartbeat messages in conformance with the UDP from the ASP to the gateway;

at the ASP, monitoring for an absence of a provisioned number of consecutive heartbeat messages within the first series;

at the gateway, monitoring for an absence of the provisioned number of consecutive heartbeat messages within the second series;

upon detection of the absence of the provisioned number of consecutive heartbeat messages within the first series, declaring at the ASP a failure of the backhaul link; and upon detection of the absence of the provisioned number of consecutive heartbeat messages within the second series, declaring at the gateway a failure of the backhaul link.

3. The method of claim 2 comprising the further step of, upon declaration at the gateway of a failure of the backhaul link, re-establishing the backhaul link.

4. The method of claim 2 comprising the further steps of, upon declaration at the gateway of a failure of the backhaul link:

transmitting a TCP Reset segment from the gateway to the ASP;

stopping transmission of the first series of heartbeat messages;

at the gateway, clearing internal calls;

at the gateway, re-establishing the backhaul link; and restarting transmission of the first series of heartbeat messages.

5. The method of claim 2 comprising the further steps of, upon declaration at the ASP of a failure of the backhaul link:

transmitting a TCP Reset segment from the ASP to the gateway;

stopping transmission of the second series of heartbeat messages;

at the ASP, clearing internal calls;

at the ASP, awaiting re-establishment of the backhaul link; and upon re-establishment of the backhaul link, restarting transmission of the second series of heartbeat messages.

6. The method of claim 2 further comprising the step of:

at the gateway, monitoring for an arrival of a TCP Reset segment from the ASP, and upon detection of a TCP Reset segment from the ASP, the further steps of:

stopping transmission of the first series of heartbeat messages;

clearing internal calls;

re-establishing the backhaul link; and restarting transmission of the first series of heartbeat messages.

7. The method of claim 2 further comprising the step of:

at the ASP, monitoring for an arrival of a TCP Reset segment from the gateway, and upon detection of a TCP Reset segment from the gateway, the further steps of:

stopping transmission of the second series of heartbeat messages;

clearing internal calls;

awaiting a re-establishment of the backhaul link; and upon re-establishment of the backhaul link, restarting transmission of the second series of heartbeat messages.

8. The method of claim 2 further comprising the step of:

at the ASP, monitoring for an arrival of a TCP Synchronization segment from the gateway, and upon detection of a TCP Synchronization segment from the gateway, the further steps of:

clearing internal calls;

in the event that a TCP stack within the ASP accepts a new backhaul link being established by the TCP Synchronization segment, the further step of:

continuing the re-establishment of the new backhaul link; and in the event that the TCP stack within the ASP does not accept the new backhaul link being established by the TCP Synchronization segment, the further steps of:

transmitting a TCP Reset segment to the gateway;

stopping transmission of the second series of heartbeat messages;

awaiting re-establishment of the backhaul link;

upon re-establishment of the backhaul link, restarting transmission of the second series of heartbeat messages.

9. The method of claim 2 wherein each heartbeat message in the first series of heartbeat messages includes a payload having a value identifying the gateway, and wherein each heartbeat message in the second series of heartbeat messages includes a payload having a value identifying the ASP.

10. The method of claim 4 wherein the step of clearing internal calls comprises the steps of:

clearing non-active calls;

initiating a recovery timer; and upon expiry of the recovery timer, the further steps of:

determining whether the backhaul link has been re-established;

if the backhaul link has not been re-established, clearing active calls.

11. The method of claim 5 wherein the step of clearing internal calls comprises the steps of:

clearing non-active calls;

initiating a recovery timer; and upon expiry of the recovery timer, the further steps of:

determining whether the backhaul link has been re-established;

if the backhaul link has not been re-established, clearing active calls.

12. The method of claim 6 wherein the step of clearing internal calls comprises the steps of:

clearing non-active calls;

initiating a recovery timer; and upon expiry of the recovery timer, the further steps of:

determining whether the backhaul link has been re-established;

if the backhaul link has not been re-established, clearing active calls.

13. The method of claim 7 wherein the step of clearing internal calls comprises the steps of:

clearing non-active calls;

initiating a recovery timer; and upon expiry of the recovery timer, the further steps of:

determining whether the backhaul link has been re-established;

if the backhaul link has not been re-established, clearing active calls.

14. The method of claim 8 wherein the step of clearing internal calls comprises the steps of:

clearing non-active calls;

initiating a recovery timer; and upon expiry of the recovery timer, the further steps of:

determining whether the backhaul link has been re-established;

if the backhaul link has not been re-established, clearing active calls.

15. A gateway capable of transmitting Layer Three Integrated Services Digital Network (ISDN) messages to an Application Server Process (ASP) through an Internet Protocol (IP) based network, the gateway comprising:
- means for establishing a backhaul link in conformance with a Transmission Control Protocol (TCP); and
- means for monitoring for a failure of the backhaul link by using heartbeat messages in conformance with a User Datagram Protocol (UDP).

16. The gateway of claim 15 wherein the means for monitoring for a failure of the backhaul link comprise:
- means for starting transmission at a regular interval of a first series of heartbeat messages in conformance with the UDP to the ASP;
- means for detecting heartbeat messages in a second series of heartbeat messages in conformance with the UDP received from the ASP;
- means for monitoring for an absence of a provisioned number of consecutive heartbeat messages within the second series of heartbeat messages; and
- upon detection of the absence of the provisioned number of consecutive heartbeat messages within the second series, declaring a failure of the backhaul link.

17. The gateway of claim 16 further comprising means for re-establishing the backhaul link in the event of a declaration of a failure of the backhaul link.

18. The gateway of claim 16 further comprising:
- means for transmitting a TCP Reset segment to the ASP in the event of a declaration of a failure of the backhaul link;
- means for stopping transmission of the first series of heartbeat messages in the event of a declaration of a failure of the backhaul link;
- means for clearing internal calls in the event of a declaration of a failure of the backhaul link;
- means for re-establishing the backhaul link in the event of a failure of the backhaul link; and
- means for restarting transmission of the first series of heartbeat messages in the event of a failure of the backhaul link.

19. The gateway of claim 16 further comprising:
- means for monitoring for an arrival of a TCP Reset segment from the ASP;
- means for stopping transmission of the first series of heartbeat messages in the event that a TCP Reset segment arrives from the ASP;
- means for clearing internal calls in the event that a TCP Reset segment arrives from the ASP;
- means for re-establishing the backhaul link in the event that a TCP Reset segment arrives from the ASP; and
- means for restarting transmission of the first series of heartbeat messages in the event that a TCP Reset segment arrives from the ASP.

20. The gateway of claim 16 wherein the means for transmitting a first series of heartbeat messages comprise means for transmitting a series of heartbeat messages each of which includes a payload having a value identifying the gateway.

21. The gateway of claim 18 wherein the means for clearing internal calls comprise:
- means for clearing non-active calls;
- means for initiating a recovery timer;
- means for determining whether the backhaul link has been re-established upon expiry of the recovery timer; and
- means for clearing active calls upon expiry of the recovery timer in the event that the backhaul link has not been re-established.

22. The gateway of claim 19 wherein the means for clearing internal calls comprise:
- means for clearing non-active calls;
- means for initiating a recovery timer;
- means for determining whether the backhaul link has been re-established upon expiry of the recovery timer; and
- means for clearing active calls upon expiry of the recovery timer in the event that the backhaul link has not been re-established.

23. An Application Server Process (ASP) capable of receiving Layer Three Integrated Services Digital Network (ISDN) messages from a gateway through an Internet Protocol (IP) based network, the ASP comprising:
- means for accepting a backhaul link connection in conformance with a Transmission Control Protocol (TCP); and
- means for monitoring for a failure of the backhaul link by using heartbeat messages in conformance with a User Datagram Protocol (UDP).

24. The ASP of claim 23 wherein the means for monitoring for a failure of the backhaul link comprise:
- means for detecting heartbeat messages in a first series of heartbeat messages in conformance with the UDP received from the gateway;
- means for starting transmission at a regular interval of a second series of heartbeat messages in conformance with the UDP to the gateway;
- means for monitoring for an absence of a provisioned number of consecutive heartbeat messages within the first series of heartbeat messages; and
- upon detection of the absence of the provisioned number of consecutive heartbeat messages within the first series, declaring a failure of the backhaul link.

25. The ASP of claim 24 further comprising:
- means for transmitting a TCP Reset segment to the gateway in the event of a declaration of a failure of the backhaul link;
- means stopping transmission of the second series of heartbeat messages in the event of a declaration of a failure of the backhaul link;
- means for clearing internal calls in the event of a declaration of a failure of the backhaul link;
- means for accepting a re-establishment of the backhaul link by the gateway in the event of a declaration of a failure of the backhaul link; and
- means for restarting transmission of the second series of heartbeat messages upon re-establishment of the backhaul link, in the event of a declaration of a failure of the backhaul link.

26. The ASP of claim 24 further comprising:
- means for monitoring for an arrival of a TCP Reset segment from the gateway;
- means for stopping transmission of the second series of heartbeat messages in the event of an arrival of a TCP Reset segment from the gateway;
- means for clearing internal calls in the event of an arrival of a TCP Reset segment from the gateway;
- means for accepting a re-establishment of the backhaul link by the gateway in the event of an arrival of a TCP Reset segment from the gateway; and
- means for restarting transmission of the second series of heartbeat messages upon re-establishment of the backhaul link by the gateway, in the event of an arrival of a TCP Reset segment from the gateway.

27. The ASP of claim 24 further comprising:

means for monitoring for an arrival of TCP Synchronization segments from the gateway, each TCP Synchronization segment attempting to establish a new backhaul link;

means for clearing internal calls in the event of an arrival of a TCP Synchronization segment from the gateway;

means for continuing the re-establishment of the new backhaul link, in the event of an arrival of a TCP Synchronization segment from the gateway and in the event that a TCP stack within the ASP accepts the new backhaul link which the TCP Synchronization segment is attempting to establish;

means for transmitting a TCP Reset segment to the gateway in the event of an arrival of a TCP Synchronization segment from the gateway and in the event that a TCP stack within the ASP does not accept the new backhaul link which the TCP Synchronization segment is attempting to establish;

means for stopping transmission of the second series of heartbeat messages in the event of an arrival of a TCP Synchronization segment from the gateway and in the event that a TCP stack within the ASP does not accept the new backhaul link which the TCP Synchronization segment is attempting to establish;

means for accepting a re-establishment of the backhaul link in the event of an arrival of a TCP Synchronization segment from the gateway and in the event that a TCP stack within the ASP does not accept the new backhaul link which the TCP Synchronization segment is attempting to establish;

means for restarting transmission of the second series of heartbeat messages upon re-establishment of the backhaul link, in the event of an arrival of a TCP Synchronization segment from the gateway and in the event that a TCP stack within the ASP does not accept the new backhaul link which the TCP Synchronization segment is attempting to establish.

28. The ASP of claim 24 wherein each heartbeat message in the second series of heartbeat messages includes a payload having a value identifying the ASP.

29. The ASP of claim 25 wherein the means for clearing internal calls comprise:

means for clearing non-active calls;

means for initiating a recovery timer;

means for determining whether the backhaul link has been re-established upon expiry of the recovery timer; and means for clearing active calls upon expiry of the recovery timer in the event that the backhaul link has not been re-established.

30. The ASP of claim 26 wherein the means for clearing internal calls comprise:

means for clearing non-active calls;

means for initiating a recovery timer;

means for determining whether the backhaul link has been re-established upon expiry of the recovery timer; and means for clearing active calls upon expiry of the recovery timer in the event that the backhaul link has not been re-established.

31. The ASP of claim 27 wherein the means for clearing internal calls comprise:

means for clearing non-active calls;

means for initiating a recovery timer;

means for determining whether the backhaul link has been re-established upon expiry of the recovery timer; and means for clearing active calls upon expiry of the recovery timer in the event that the backhaul link has not been re-established.

32. A Media Gateway Controller including the ASP of claim 23.

33. A communication system comprising a gateway coupled to an IP based network, comprising a Media Gateway Controller (MGC) coupled to the IP based network, and comprising:

means within the gateway for establishing a backhaul link to the MGC through the IP based network in conformance with a Transmission Control Protocol;

means within the gateway for transmitting a Layer Three Integrated Services Digital Network message to the MGC over the backhaul link;

means within the gateway for monitoring for a failure of the backhaul link by using heartbeat messages in conformance with a User Datagram Protocol (UDP); and means within the MGC for monitoring for a failure of the backhaul link by using heartbeat messages in conformance with the UDP.

\* \* \* \* \*